(12) United States Patent
Grim, III et al.

(10) Patent No.: US 9,092,494 B1
(45) Date of Patent: Jul. 28, 2015

(54) INFORMATION VAULT, DATA FORMAT CONVERSION SERVICES SYSTEM AND METHOD

(71) Applicant: Google Inc., Mountain View, CA (US)

(72) Inventors: Clifton E. Grim, III, Seabrook, TX (US); Christopher I Schmidt, Friendswood, TX (US); John D Wilson, Houston, TX (US)

(73) Assignee: GOOGLE INC., Mountain View, CA (US)

( * ) Notice: Subject to any disclaimer, the term of this patent is extended or adjusted under 35 U.S.C. 154(b) by 136 days.

(21) Appl. No.: 14/077,494

(22) Filed: Nov. 12, 2013

Related U.S. Application Data (63) Continuation of application No. 10/964,794, filed on Oct. 14, 2004, now Pat. No. 8,620,816.

(51) Int. Cl.
*G06F 21/00* (2013.01)
*G06F 17/30* (2006.01)

(52) U.S. Cl.
CPC .............................. *G06F 17/30569* (2013.01)

(58) Field of Classification Search
USPC ............ 705/16, 21, 59, 71; 380/44, 262, 278, 380/279
See application file for complete search history.

(56) References Cited

U.S. PATENT DOCUMENTS

| | | |
|---|---|---|
| 4,008,985 A | 2/1977 | Schemmann et al. |
| 4,088,985 A * | 5/1978 | Saito et al. ................... 340/605 |
| 5,426,281 A | 6/1995 | Abecassis |
| 5,608,874 A | 3/1997 | Ogawa et al. |
| 5,708,828 A | 1/1998 | Coleman |
| 5,892,900 A | 4/1999 | Ginter et al. |
| 5,910,988 A | 6/1999 | Ballard |
| 6,105,131 A | 8/2000 | Carroll |
| 6,141,423 A | 10/2000 | Fischer |
| 6,182,050 B1 | 1/2001 | Ballard |
| 6,216,229 B1 | 4/2001 | Fischer |
| 6,219,831 B1 | 4/2001 | Ono |
| 6,247,127 B1 | 6/2001 | Vandergeest |
| 6,298,348 B1 | 10/2001 | Eldering |
| 6,324,650 B1 | 11/2001 | Ogilvie |
| 6,334,109 B1 | 12/2001 | Kanevsky et al. |
| 6,336,124 B1 | 1/2002 | Alam et al. |
| 6,438,690 B1 | 8/2002 | Patel et al. |
| 6,542,913 B1 | 4/2003 | Deriso et al. |

(Continued)

FOREIGN PATENT DOCUMENTS

WO WO0229516 4/2002

*Primary Examiner* — Dante Ravetti
(74) *Attorney, Agent, or Firm* — Young Basile Hanlon & MacFarlane P.C.

(57) ABSTRACT

A system and method for providing a secured information vault so that individual owners of personal data may control and manage the access and dissemination of the personal data. The system and method provides for the owner of the personal data to receive compensation for the use of the personal data, thus, in effect, the personal data becomes a valuable commodity analogous to money. Centralized protected storage of personal data is provided, which minimizes the number of copies that may be in existence. The personal data may be converted from one format to another by subscribing to format conversion services provide by the vault. The vault regularly updates stored personal data per the subscribed services so that the personal data is available in the latest data formats used by various industries. A fee may be charged for format conversions.

20 Claims, 5 Drawing Sheets

(56) References Cited

U.S. PATENT DOCUMENTS

| | | |
|---|---|---|
| 6,631,397 B1 | 10/2003 | Satomi et al. |
| 6,954,753 B1 | 10/2005 | Jeran |
| 6,993,326 B2 | 1/2006 | Link, II et al. |
| 7,013,388 B2 | 3/2006 | Fisk et al. |
| 7,587,366 B2 | 9/2009 | Grim, III et al. |
| 2002/0070932 A1* | 6/2002 | Kim ............................... 345/419 |
| 2003/0195767 A1* | 10/2003 | Hartman et al. .................. 705/1 |
| 2004/0010524 A1* | 1/2004 | Wallace et al. ............... 707/205 |
| 2004/0083184 A1* | 4/2004 | Tsuei et al. ..................... 705/74 |
| 2004/0133793 A1* | 7/2004 | Ginter et al. ................... 713/193 |
| 2004/0201604 A1* | 10/2004 | Kraenzel et al. ............. 345/700 |

* cited by examiner

INFORMATION VAULT, DATA FORMAT CONVERSION SERVICES SYSTEM AND METHOD

CROSS REFERENCE TO RELATED APPLICATIONS

This application is a continuation of and claims priority to U.S. application Ser. No. 10/964,794 filed Oct. 14, 2004 which is incorporated herein by reference in its entirety.

FIELD OF THE INVENTION

The invention generally relates to a system and method for an information vault and, more particularly, to a system and method for an information vault and format conversion services for data formats stored in or processed by the information vault.

BACKGROUND

As the world becomes more wired and electronic storage becomes cheaper than the cost of paper, the protection of information becomes paramount. But, the ease with which information can be copied and propagated causes serious information privacy issues. Keeping information safe and secure is thus one of the biggest issues facing the information technology (IT) industry today.

There are several areas of concern regarding the protection of information including the danger of unrecoverable loss of the information itself and defense against unauthorized copying of the digital information. Also, the control of access to the information may pose certain risk factors to the owner of the information and to the thousands of other organizations who hold copies of this information for business reasons. Ultimately, there may be a potential loss of financial opportunity based on the use of the information.

Unrecoverable loss of data is familiar to nearly everyone. Important documents, images, and financial information are frequently lost not only for individuals but small organizations as well as large. Unrecoverable loss may undermine a business' future to continue or operate.

Further, unauthorized replication of information is a serious problem and may be illustrated with the notion of information theft of credit card numbers. While it is unlikely that the illicit copying of digital objects may be completely eradicated, original access to personal information needs to be controlled tighter. For example, access to medical records, credit card and other financial information needs to be managed so that privacy is maintained more rigorously. Additionally, the transit of this personal information needs to be protected as well as facilitated, such as, the passing of credit card and transaction information, medical records, and the like.

Ultimately, information is valuable. The illicit use of information could cause a financial loss to the owner or confer an unfair advantage to another party. For example, organizations collect personal information and preferences and sell them on the open market as phone lists, market research, or the like. The individual who owns this information (i.e., the person themselves) is never directly or indirectly compensated. Instead, the information compilers or middlemen essentially take an individual's information and sell the information. Not only does the individual not get compensated for the middlemen's and advertisers' use of the information but are also indiscriminately solicited or spammed as a result.

When information is stored over time, the formats may become obsolete. As newer formats (i.e., the newest format) become available, stored data inevitably becomes dated and potentially useless. Owners of the data are often required to acquire proper data conversion tools and then perform the conversion themselves if they do not want their data to eventually become stale and potentially useless, or at least more difficult to use or access. If users of the stored data, such as commercial marketers, have access to the data, then the data owner is typically obligated to keep the data in the latest formats if they expect the data to be of value to the users. However, keeping that stored data in the latest formats typically require purchases of newer applications, which may be very costly.

SUMMARY OF THE INVENTION

In an aspect of the invention, a method of converting information formats is provided. The method comprises the steps of placing a new data format in a conversion database, the new data format previously not included in the conversion database; adding, by a processor, one or more conversion rules to the conversion database, wherein each of the one or more conversion rules specifies a from-format, a to-format, and a conversion routine for converting data items from the from-format to the to-format, and wherein the adding is performed asynchronously. The method further includes creating, by the processor, at least one conversion subscription in the conversion database, wherein the creating is performed asynchronously, and wherein the at least one conversion subscription encompasses conversions performed using the one or more added conversion rules.

The example method further includes performing, by the processor, a conversion scan for each of the conversion subscriptions, wherein the performing of the conversion scan is responsive to the placement of the new data format in the conversion database and the addition of the one or more conversion rules including the new data format, wherein the conversion scan is performed asynchronously, and wherein the conversion scan includes: querying, by the processor, an information index for the one or more data items having a from-format matching a from-format type of one or more conversion rules, determining, by the processor, that an identifier of the one or more data items matches an identifier of an owner of the one or more conversion subscriptions; and converting, based on the determination, the one or more data items to the to-format associated with the new data format as specified in the one or more conversion rules such that at least one of the one or more data items is maintained in the new data format; storing, by the processor, the one or more converted data items in the information index; and updating, by the processor, the information index with parameters of the one or more converted data items.

In another aspect of the invention, a method of converting formats is provided. The method includes the steps of: placing at least one new data format in a conversion database; creating one or more conversion subscription accounts in a secured vault specifying at least one data item to maintain in the at least one new data format, the secured vault located remotely from a user computer system; adding one or more conversion rules to the secured vault, each of the one or more conversion rules specifying a from-format, a to-format associated with the at least one new format, and a conversion routine; and performing a conversion scan for each of the one or more conversion subscription accounts immediately when the at least one new data format is placed in the conversion database and is specified in the one or more conversion rules In the example method, the conversion scan comprises: querying the conversion database for the at least one data item having the from-format matching one or more data conversion descriptions from-format type and having an identifier matching an owner of the one or more conversion subscription accounts; for each positive matching result of the querying, converting the at least one data item to the to-format as specified in the matching each one or more data conversion descriptions; converting at least one of the data items to the at least one new data format using the conversion routine specified in the one or more conversion rules such that the at least one of the one or more data items is maintained in the at least one new data format; and updating an information index with parameters of the converted data items.

In another aspect of the invention, an apparatus is provided. The apparatus includes one or more processors; and one or more non-transitory computer readable mediums for storing program instructions used by the one or more processors, wherein the program instructions, when executed by the one or more processors, cause the one or more processors to perform the steps of: placing a new data format in a conversion database, the new data format previously not included in the conversion database; adding one or more conversion rules to the conversion database, wherein each of the one or more conversion rules specifies a from-format, a to-format, and a conversion routine for converting data items from the from-format to the to-format, and wherein the adding is performed asynchronously.

In the example apparatus, one or more processors also performs the steps of: creating at least one conversion subscription in the conversion database, wherein the creating is performed asynchronously, and wherein the at least one conversion subscription encompasses conversions performed using the one or more added conversion rules; performing a conversion scan for each of the conversion subscriptions, wherein the performing of the conversion scan is responsive to the placement of the new data format in the conversion database and the addition of the one or more conversion rules including the new data format, wherein the conversion scan is performed asynchronously, and wherein the conversion scan includes: querying an information index for the one or more data items having a from-format matching a from-format type of one or more conversion rules, determining that an identifier of the one or more data items matches an identifier of an owner of the one or more conversion subscriptions; and converting, based on the determination, the one or more data items to the to-format associated with the new data format as specified in the one or more conversion rules such that at least one of the one or more data items is maintained in the new data format; storing the one or more converted data items in the information index; and updating the information index with parameters of the one or more converted data items.

DETAILED DESCRIPTION

This invention is, generally, in one embodiment, directed to a system and method for providing an information vault so that individual owners of personal data may control and manage the formats involved in the accessing and dissemination of the personal data or developed information such as intellectual property. The invention may also provide for a service to keep the personal data in the latest (i.e., newest) industry formats. The system and method may also provide for charging fees for conversion of the data to a different format.

To this end, the system and method of the invention provides a trusted storage of personal data in an information vault, thereby minimizing the number of copies that may be in existence. Second party access to the trusted storage of personal data may be made on-demand, as required for commerce, with a process for assessing fees for accesses.

Figure 1:
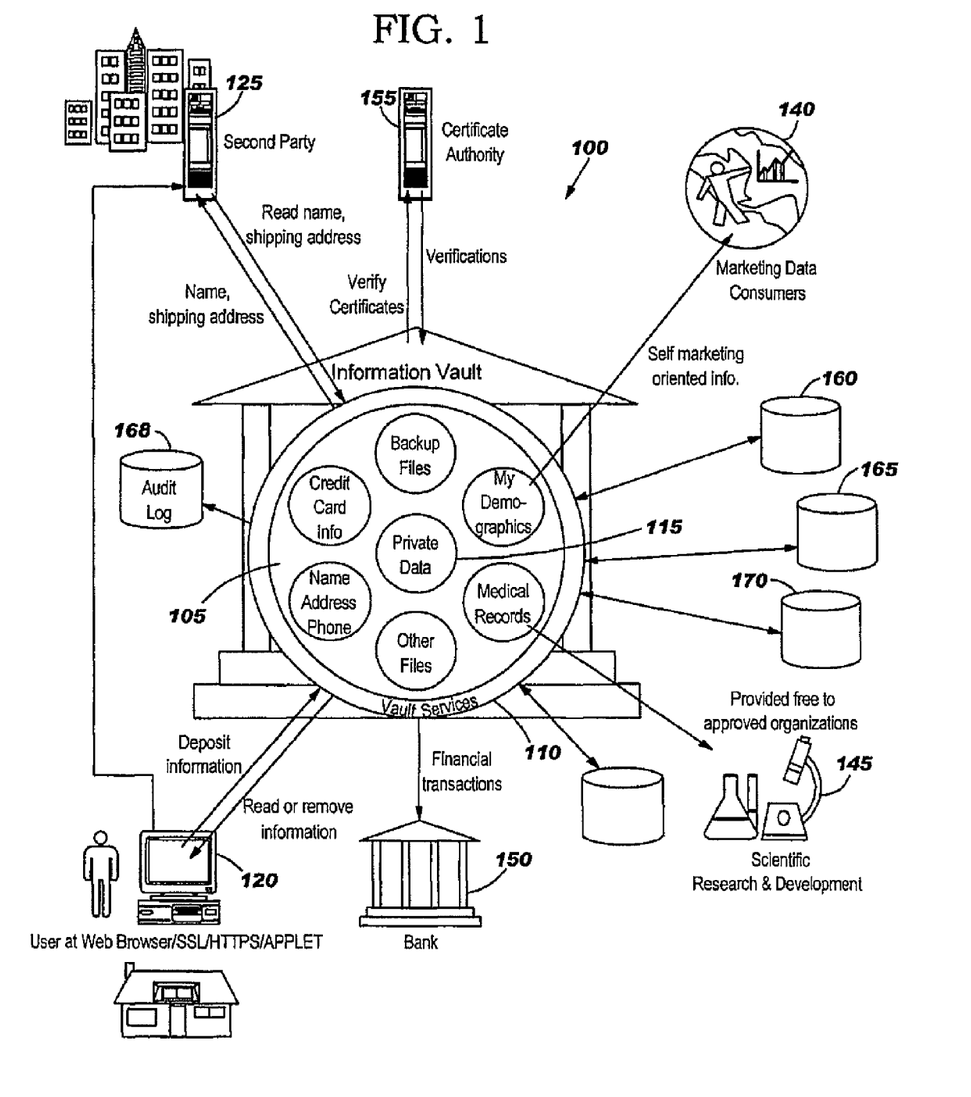
FIG. 1 is an exemplary overview of an embodiment of the invention.

FIG. 1 is an exemplary overview of an embodiment of the invention. An "Information Vault", generally denoted by reference numeral 100, provides for an information infrastructure patterned somewhat after the currency model of the world's financial infrastructure, for example. The vault 100 employs current data storage 105 and security technologies to provide a secure storage mechanism for user's information, such as for example, intellectual property, name, address, phone numbers, medical records, credit card information, demographic information, contact information or similar personal data to name but a few. Certain information may be encrypted by the owner to make the data totally private, even from the vault, as denoted by reference numeral 115. A computer system 120 (e.g., a personal computer) may be employed by a user to read or remove information from the vault or to deposit information to the vault.

A set of vault services 110 are provided, built on the vault's secure storage, to allow users to create accounts, deposit information in any form, and read or remove the information or to convert formats of data. Conversion of the formats may be automatically accomplished via a conversion subscription provided by the vault services 110. Information may be stored in the vault, encrypted by the vault and optionally, users bay encrypt the information with their own private key.

In addition, vault services 110 are provided to allow a user to specify conditions, in a secure way via technologies of the existing Public Key Infrastructure (PKI), so that a second party 125 may have read access to certain, sharable portions of the user's information. All accesses typically use the first and second party's public keys as identification. To share information with a second party, a contract data token specifying the two parties' public keys may be created and digitally signed by the first party's private key to ensure that access to private information is not propagated beyond the second party. This feature of the invention allows a migration away from the current approach of users providing second party entities (e.g., online web merchants) their personal information and thereafter being compelled to trust the merchants to securely protect the information from compromise.

FIG. 1 shows that the invention may provide for charging fees (e.g., via banking transactions 150) for information vault services or Certificate Authorities 155 of the PKI for certificate and key verifications. The interface to the bank 150 may include interfaces to financial networks for debits and payments for vault transactions and services, for example. The invention may also provide audit logs of transactions provided in database 168.

The information vault 100 may also include several databases for maintaining information concerning user accounts including, for example, a vault information index 160 for locating and retrieving stored data associated with a user or subscriber. Also, a conversion database 165 may also provide for storing information concerning conversion subscriptions and conversion rules for defining parameters for converting formats. The information vault may also include a financial database 170 for defining fees and charges associated with format conversion services. In embodiments, other databases may be provided by the invention as described below.

To this end, as described above and in more detail below, the invention is capable of providing underlying technology and business processes for providing an information vault, exchange and processing system that include in embodiments, format conversion services that permit owners of stored information to convert data formats from one to another so that their data is kept in the latest formats. Examples of the data conversion and services include, but are not limited to, the following as one of ordinary skill in the art would recognize:

converting older MS Work documents (i.e., Word 95) to Word XP.

converting Lotus 1-2-3 Spreadsheets to Excel XP.

converting .gif images to .jpeg images.

converting Midi Audio files to MPEG-4 structured audio.

The centralized data conversion services of the invention provide several advantages. This includes avoiding the cost associated with acquiring the latest application or conversion tool and management of old versions and new versions. Further, the centralized conversion services of the invention frees up the information owner's time since the owner need not acquire conversion tools, and the invention may convert to the latest formats automatically when the newer formats become available. In this way, other consumers of the information may access the information in latest formats.

Figure 2:
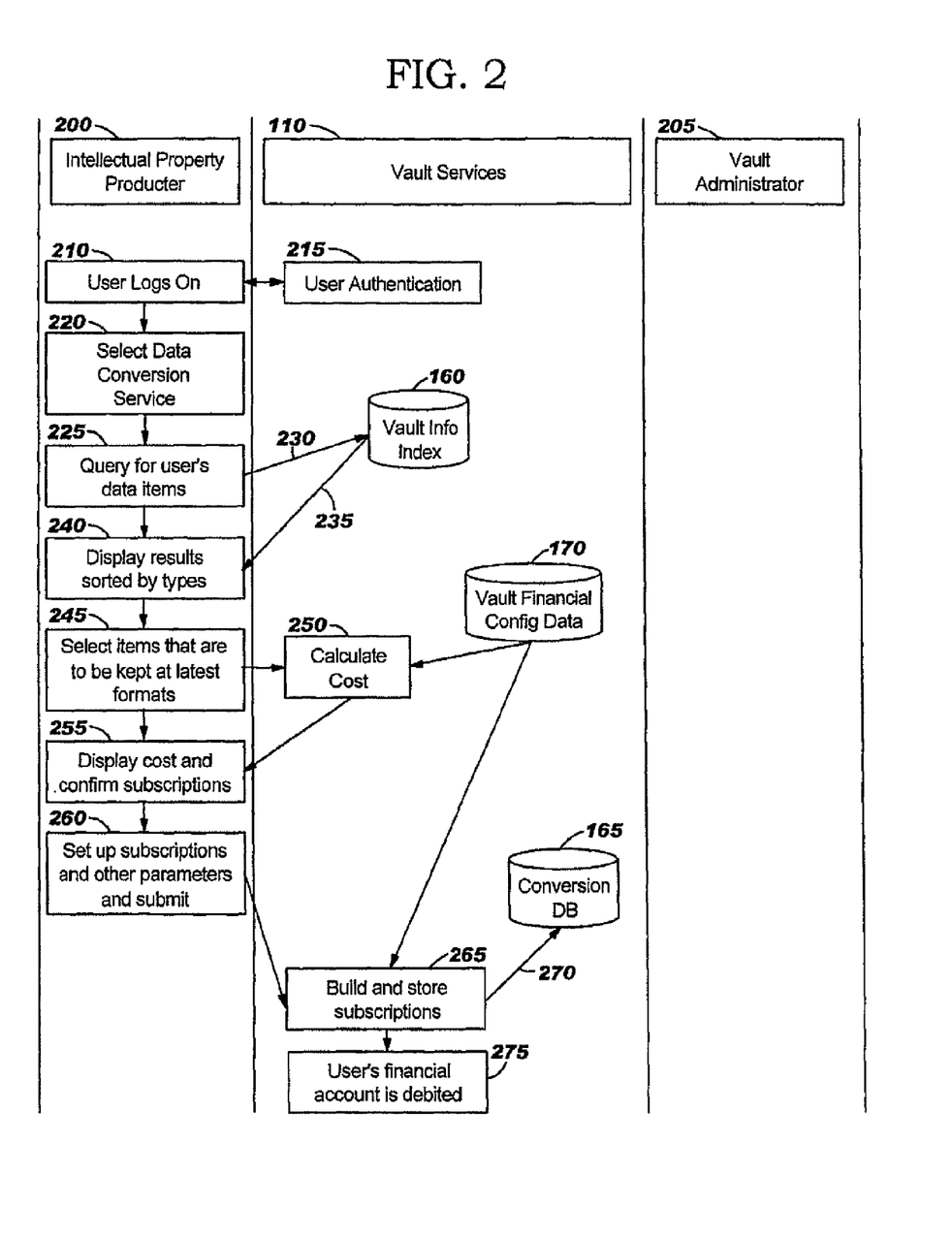
FIG. 2 is a swim lane diagram showing steps of an embodiment of adding a conversion subscription.

FIG. 2 is a swim lane diagram showing steps of an embodiment of adding a conversion subscription. "Swim lane" diagrams may be used to show the relationship between the various "actors" in the processes and to define the steps involved in the processes. FIG. 2 (and all the other swim lane Figures) may equally represent a high-level block diagram of components of the invention implementing the steps thereof. The steps of FIG. 2 (and all the other Figures employing swim lane diagrams) may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network. The steps of FIG. 2 (and the other swim lane Figures) may also be implemented by the embodiment of FIG. 1.

Referring to FIG. 2, three swim lanes are shown, including a lane for intellectual property producer 200, vault services 110, and a vault administrator 205. At step 210, the intellectual property producer logs into the vault services. At step 215, the intellectual property producer may be authenticated. At step 220, the intellectual property producer may select a data conversion service from a list of services, for example, by navigating a graphical user interface (GUI) to a data conversion services dialog. At step 225, the intellectual property producer may query for data items associated with intellectual property producer stored in the vault.

At step 230, a query is submitted to the vault services where a vault information index 160 is consulted to locate data items associated with intellectual property producer. At step 235, any found data items are returned to the intellectual property producer and, at step 240, the results are displayed, optionally sorted by type. At step 245, the intellectual property producer may select data items that are to be kept (i.e., earmarked) in the latest formats (i.e., selected for conversion). At step 250, the vault services calculate a cost associated with keeping the selected items in the latest formats, which may depend on the types of formats that are selected. Certain conversions may have higher or lower charges than other conversions; this may involve consulting a vault financial database 170 to retrieve the current costs of format conversions At step 255, the costs are displayed and a prompt to confirm the subscription(s) is issued to the intellectual property producer. At step 260, the intellectual property producer confirms and sets up the subscriptions desired and other parameters associated with the terms and limits of the subscription, which are submitted to the vault services 110. At step 265, the vault services builds and stores the subscriptions. At step 270, the subscriptions may be stored in the conversion database 165. At step 275, optionally, the intellectual property producer's financial account (e.g., a credit card) may be debited and charged a fee for using• the services.

Figure 3:
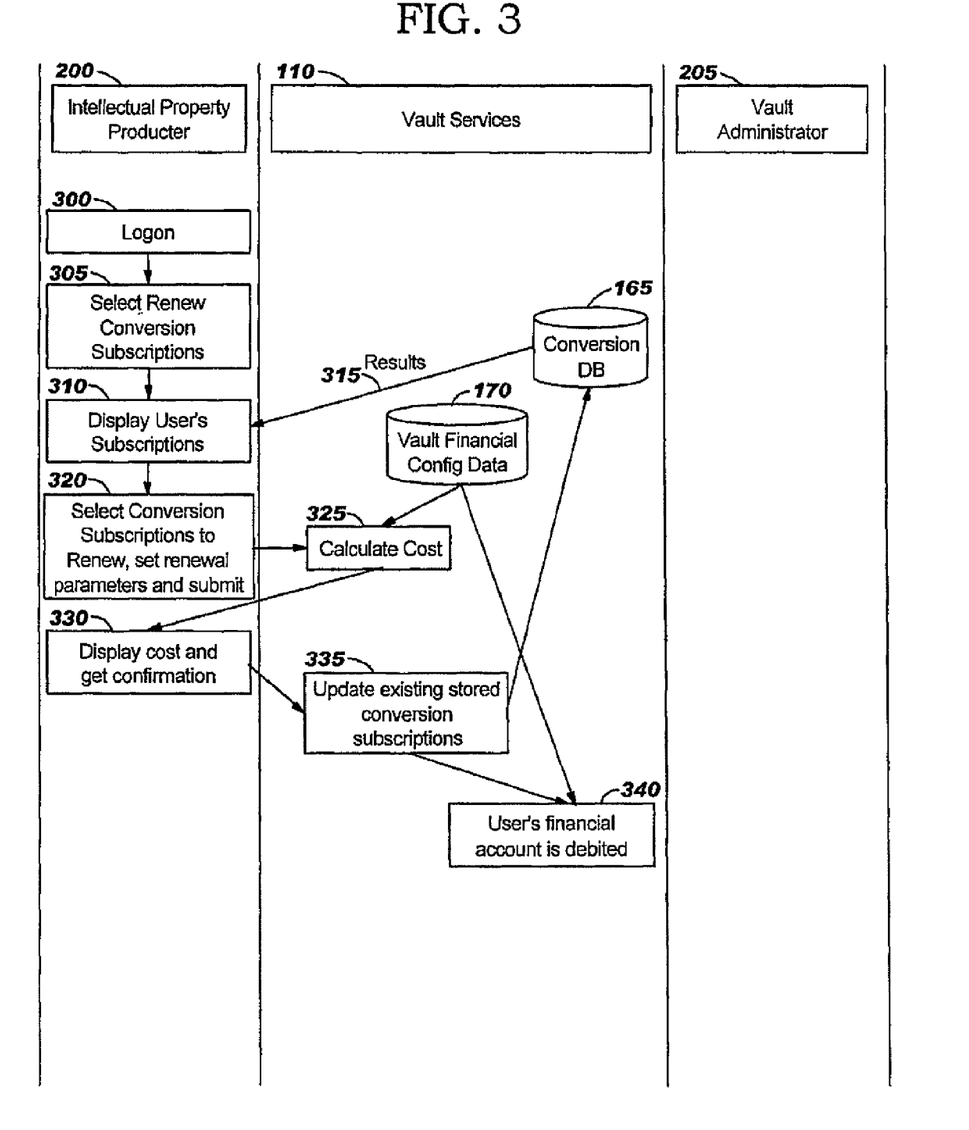
FIG. 3 is a swim-lane diagram showing steps of an embodiment of renewing a conversion subscription.

FIG. 3 is a swim-lane diagram showing steps of an embodiment of renewing a conversion subscription. Referring to FIG. 3, three swim lanes are shown, including a lane for intellectual property producer 200, vault services 110, and vault administrator 205. At step 300, the intellectual property producer may log on to the vault services and typically is authenticated by the vault services. At step 305, the intellectual property producer may select an option to renew one or more conversion subscriptions in the vault services by navigating to a renew conversion services dialog in a GUI.

At step 310, the vault services displays results from the conversion database displaying current user subscriptions. At step 320, the intellectual property producer selects conversion subscriptions that the intellectual property producer wishes to renew and sets renewal parameters for the selected subscriptions and submits to the vault services. At step 325, the vault services may consult a vault financial configuration database and calculate a cost for the conversion subscription renewal as requested by the intellectual property producer. At step 330, the vault services display costs to the intellectual property producer and prompts for confirmation. At step 335, when confirmed, the vault services may update the existing stored conversion subscriptions in a conversion database 165. At step 340, optionally, the vault services debits the intellectual property producer's financial account to charge for the service.

Figure 4:
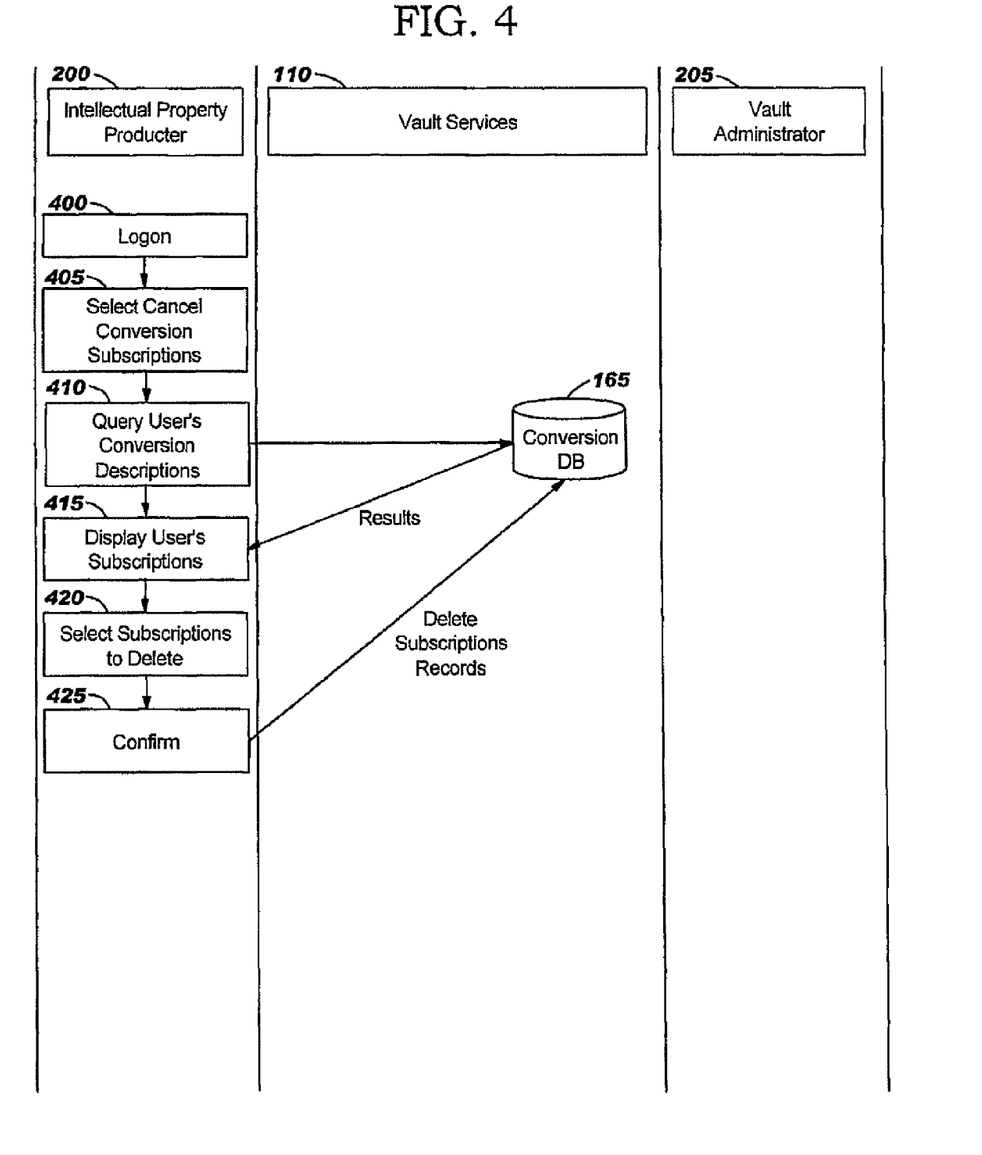
FIG. 4 is a swim-lane diagram showing steps of an embodiment for canceling a conversion subscription.

FIG. 4 is a swim-lane diagram showing steps of an embodiment for canceling a conversion subscription. Referring to FIG. 4, three swim lanes are shown, including a lane for intellectual property producer 200, vault services 110 and vault administrator 205. At step 400, the intellectual property producer logs into the vault services. Typically, the login includes authentication of the intellectual property producer. At step 405, the intellectual property producer may select an option to cancel one or more conversion subscriptions as provided by the vault services by navigating to a cancel subscription services dialog graphical user interface (GUI).

At step 410, the intellectual property producer may query the conversion descriptions as contained in the conversion database 165 of the vault services. At step 415, the results of the query are displayed to the intellectual property producer. The results typically contain a list of all of the intellectual property producer's subscriptions. At step 420, the intellectual property producer may select one or more subscriptions to delete. At step 425, a confirmation is typically issued by the vault services to confirm the subscriptions to be deleted. Upon confirmation, the subscriptions indicated to be deleted, are recorded in the conversion database of the vault services.

Figure 5:
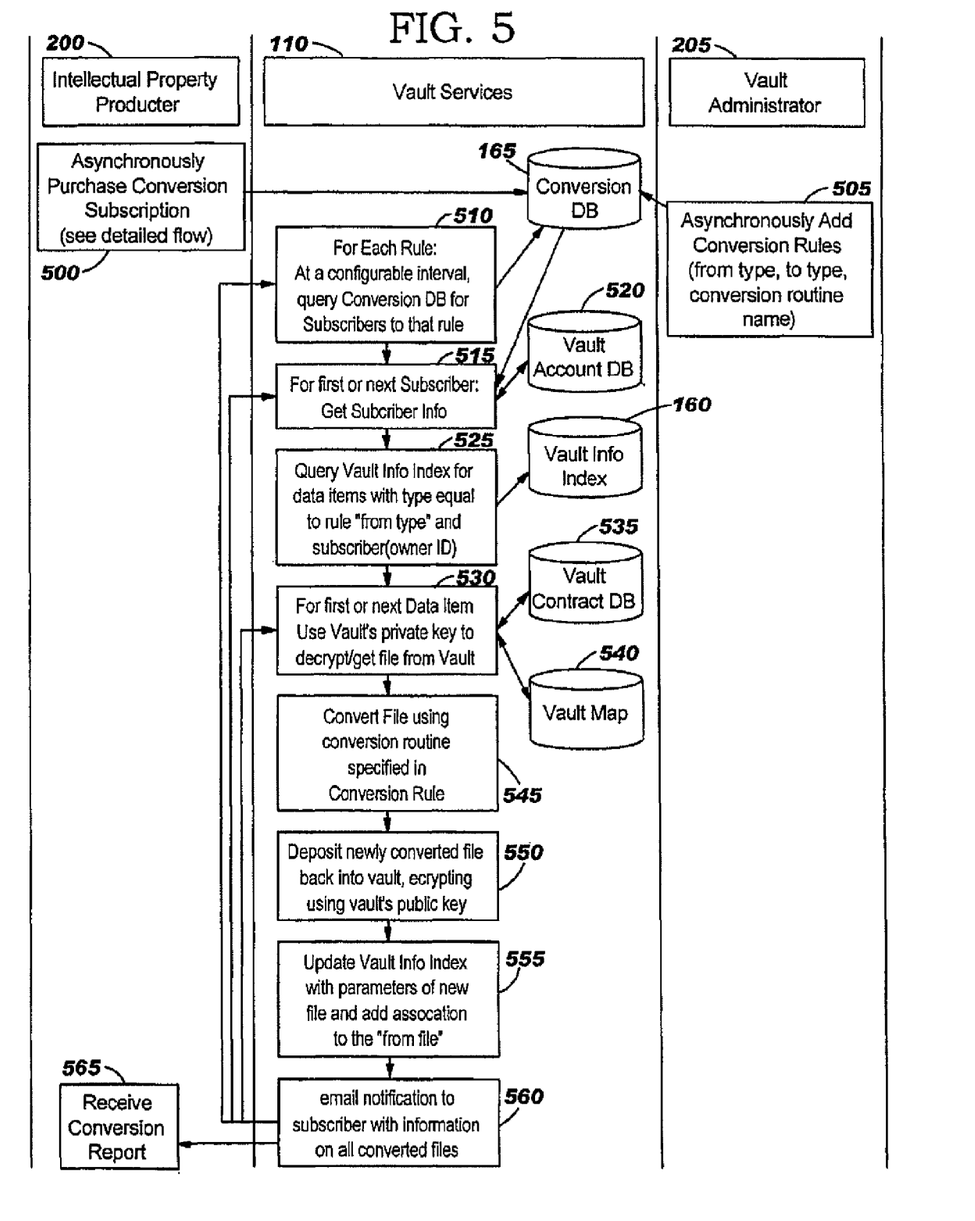
FIG. 5 is a swim-lane diagram showing steps of an embodiment for converting data formats.

FIG. 5 is a swim-lane diagram showing steps of an embodiment for converting data formats. Referring to FIG. 5, three swim lanes are shown, including a lane for an intellectual property producer 200, vault services 110, and a vault administrator 205. The vault administrator 205 typically is a responsible party associated with the provider of the information vault that maintains and manages the conversions and conversion rules associated with the multitude of format conversion services. At step 500, which may be an asynchronously performed step, an intellectual property producer may purchase conversion subscription service, as detailed, for example, in FIG. 2. Any purchased conversion subscription(s) may be stored in the vault conversion database 165.

At step 505, which may be an asynchronously performed step, a vault administrator may add conversion rule(s) to the conversion database. The conversion rule(s) typically include a "from-format" type, a "to-format" type, and a conversion routine name or identifier. At step 510, the vault services periodically loops/scans through all the conversion rules in the conversion database. This function is typically performed at a configurable interval. For each rule, the vault services queries the conversion database for any subscribers that has subscribed to that rule. At step 515, the vault services use the first (or the next) subscriber's identity to query the subscriber information as maintained by the vault account database 520.

At step 525, the vault services issues a query to the vault information index 160 for data items matching both the type equal to the rule's "from-format" type and the subscriber/owner I.D. At step 530, the vault services uses the first or the next data item retrieved from the vault info index and uses the vaults private key to decrypt and retrieve the corresponding file from the vault storage. This may involve, in embodiments, using a contract database to determine the encryption method and a vault map to locate and decrypt the data items. At step 545, the vault services may convert the file using the conversion routine specified in the conversion rules from the conversion database.

At step 550, the vault services may deposit the newly converted file back into the vault encrypting the file using the vault's public key. At step 555, the vault services updates the vault info index with parameters of the new file and adds an association to the "from file." If more data items are necessary to be retrieved, the process continues at step 530, otherwise at step 560, the vault services may optionally email notification to a subscriber/owner with information on all of the converted files. If there are more subscribers to be processed, then the flow continues at step 515. If all of the subscribers have been processed for this rule, then the process continues with step 510, if there is another rule to be processed. At step 565, the intellectual property producer may receive a conversion report from the vault services. The process then ends.

Alternatively, a conversion scan may be initiated whenever a new format becomes available. In this way, conversions may occur immediately as soon as the new formats are placed into the conversion database and associated with one or more rules.

While the invention has been described in terms of embodiments, those skilled in the art will recognize that the invention can be practiced with modifications and in the spirit and scope of the appended claims.

What is claimed is:

1. A method of converting data item formats, comprising:
  placing a new data format in a conversion database, the new data format previously not included in the conversion database;
  adding, by a processor, one or more conversion rules to the conversion database,
    wherein each of the one or more conversion rules specifies a from-format, a to-format, and a conversion routine for converting data items from the from-format to the to-format, and
    wherein the adding is performed asynchronously;
  creating, by the processor, at least one conversion subscription in the conversion database,
    wherein the creating is performed asynchronously, and
    wherein the at least one conversion subscription encompasses conversions performed using the one or more added conversion rules;
  determining, by the processor, the placement of the new data format in the conversion database and the addition of the one or more conversion rules including the new data format;
  based on the determination of the placement of the new data format in the conversion database and the addition of the one or more conversion rules including the new data format, performing, by the processor, a conversion scan for each of the conversion subscriptions;
    wherein the conversion scan is performed asynchronously, and
    wherein the conversion scan includes:
      querying, by the processor, an information index for the one or more data items having a from-format matching a from-format type of one or more conversion rules,
      determining, by the processor, that an identifier of the one or more data items matches an identifier of an owner of the one or more conversion subscriptions; and
      converting, based on the determination, the one or more data items to the to-format associated with the new data format as specified in the one or more conversion rules such that at least one of the one or more data items is maintained in the new data format;
  storing, by the processor, the one or more converted data items in the information index; and
  updating, by the processor, the information index with parameters of the one or more converted data items.

2. The method of claim 1, wherein the converting step further matches a conversion subscription specifying the one or more conversion rules.

3. The method of claim 1, further comprising canceling at least one of the conversion subscriptions.

4. The method of claim 1, further comprising charging a fee for the creating or converting steps.

5. The method of claim 1, wherein converting the one or more data items further comprises:
  determining, by the processor, the availability of a new format conversion routine; and
  based on the determination of the availability of the new format conversion routine, converting the one or more data items.

6. The method of claim 1, further comprising renewing the conversion subscription and updating an existing stored conversion subscription in a secured vault.

7. The method of claim 6, wherein the renewing includes charging a fee.

8. The method of claim 6, further comprising updating the secured vault with at least one of the one or more the converted data items.

9. The method of claim 1, wherein the conversion subscription includes a time duration of the conversion subscription.

10. The method of claim 1, further comprising:
adding an association to the one or more converted data items.

11. A method of converting formats, comprising:
placing at least one new data format in a conversion database;
creating, by a processor, one or more conversion subscription accounts in a secured vault specifying at least one data item to maintain in the at least one new data format, the secured vault located remotely from a user computer system;
adding, by the processor, one or more conversion rules to the secured vault, each of the one or more conversion rules specifying a from-format, a to-format associated with the at least one new format, and a conversion routine; and
determining, by the processor, the placement of the new data format in the conversion database and the addition of the one or more conversion rules including the new data format;
based on the determination of the placement of the new data format in the conversion database and the addition of the one or more conversion rules including the new data format, performing, by the processor, a conversion scan for each of the conversion subscriptions, the conversion scan comprising:
querying the conversion database for the at least one data item having the from-format matching one or more data conversion descriptions from-format type and having an identifier matching an owner of the one or more conversion subscription accounts;
for each positive matching result of the querying, converting the at least one data item to the to-format as specified in the matching each one or more data conversion descriptions;
converting at least one of the data items to the at least one new data format using the conversion routine specified in the one or more conversion rules such that the at least one of the one or more data items is maintained in the at least one new data format; and
updating an information index with parameters of the converted data items.

12. The method of claim 11, wherein the converting is performed automatically by scanning for a match between a conversion rule from-format to the to-format of the one or more data items.

13. The method of claim 11, wherein the converting step further matches a conversion subscription account specifying the one or more conversion rules.

14. The method of claim 11, further comprising updating the secured vault with at least one of the one or more the converted data items.

15. The method of claim 11, further comprising canceling at least one of the one or more conversion subscription accounts.

16. The method of claim 11, further comprising charging a fee for the creating or converting steps.

17. The method of claim 11, wherein the conversion subscription includes a time duration of the conversion subscription.

18. The method of claim 11, further comprising:
adding an association to the one or more converted data items.

19. An apparatus, comprising:
one or more processors; and
one or more non-transitory computer readable mediums for storing program instructions used by the one or more processors, wherein the program instructions, when executed by the one or more processors, cause the one or more processors to perform the steps of:
placing a new data format in a conversion database, the new data format previously not included in the conversion database;
adding one or more conversion rules to the conversion database,
wherein each of the one or more conversion rules specifies a from-format, a to-format, and a conversion routine for converting data items from the from-format to the to-format, and
wherein the adding is performed asynchronously;
creating at least one conversion subscription in the conversion database,
wherein the creating is performed asynchronously, and
wherein the at least one conversion subscription encompasses conversions performed using the one or more added conversion rules;
determining the placement of the new data format in the conversion database and the addition of the one or more conversion rules including the new data format;
based on the determination of the placement of the new data format in the conversion database and the addition of the one or more conversion rules including the new data format, performing, by the processor, a conversion scan for each of the conversion subscriptions;
wherein the conversion scan is performed asynchronously, and
wherein the conversion scan includes:
querying an information index for the one or more data items having a from-format matching a from-format type of one or more conversion rules,
determining that an identifier of the one or more data items matches an identifier of an owner of the one or more conversion subscriptions; and
converting, based on the determination, the one or more data items to the to-format associated with the new data format as specified in the one or more conversion rules such that at least one of the one or more data items is maintained in the new data format;
storing the one or more converted data items in the information index; and
updating the information index with parameters of the one or more converted data items.

20. The apparatus of claim 19, wherein the one or more processors are further configured to perform the step of:
canceling at least one of the one or more conversion subscription accounts.

* * * * *